(12) United States Patent
Keceli et al.

(10) Patent No.: US 10,908,668 B2
(45) Date of Patent: Feb. 2, 2021

(54) VOLTAGE DROOP MITIGATION TECHNOLOGY IN ARRAY PROCESSOR CORES

(71) Applicant: Intel Corporation, Santa Clara, CA (US)

(72) Inventors: Fuat Keceli, Portland, OR (US); Jonathan Eastep, Portland, OR (US); Kelly Livingston, Beaverton, OR (US); Federico Ardanaz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 15/858,030

(22) Filed: Dec. 29, 2017

(65) Prior Publication Data

US 2019/0041942 A1 Feb. 7, 2019

(51) Int. Cl.
| | |
|---|---|
| G06F 1/32 | (2019.01) |
| G06F 1/30 | (2006.01) |
| G06F 1/324 | (2019.01) |
| G06F 1/3296 | (2019.01) |
| G06F 1/3206 | (2019.01) |
| G06F 1/3234 | (2019.01) |

(52) U.S. Cl.
CPC ............ *G06F 1/324* (2013.01); *G06F 1/305* (2013.01); *G06F 1/3206* (2013.01); *G06F 1/3243* (2013.01); *G06F 1/3296* (2013.01)

(58) Field of Classification Search
CPC ..................................... G06F 1/26; G06F 1/32
See application file for complete search history.

(56) References Cited

U.S. PATENT DOCUMENTS

| | | | | |
|---|---|---|---|---|
| 7,132,822 | B1 * | 11/2006 | Breitlow ................... | G06F 1/30 324/142 |
| 8,051,316 | B2 * | 11/2011 | Roberts ................. | G06F 1/3203 713/300 |
| 8,261,102 | B2 * | 9/2012 | Cheng ..................... | G06F 1/263 307/18 |
| 2012/0144221 | A1 * | 6/2012 | Naffziger .............. | G06F 1/3203 713/340 |
| 2015/0378412 | A1 * | 12/2015 | Suryanarayanan ... | G06F 1/3206 713/340 |
| 2018/0067532 | A1 * | 3/2018 | Chuang ................... | G06F 1/305 |
| 2019/0041942 | A1 * | 2/2019 | Keceli ................... | G06F 1/3243 |

OTHER PUBLICATIONS

Kelly Livingston et al., U.S. Appl. No. 15/856,154, entitled "Accurate Voltage Control to Enhance Power Performance of Circuits", filed Dec. 28, 2017, 34 pages.

* cited by examiner

*Primary Examiner* — Phil K Nguyen
(74) *Attorney, Agent, or Firm* — Jordan IP Law, LLC

(57) ABSTRACT

Systems, apparatuses and methods may provide for determining, from a program comprising graphs of parallel operations and dependencies, an estimation of a droop risk associated with execution of the graphs by a load. A risk signal may be outputted based on the estimation. The risk signal may be associated with an adjustment in an output voltage of a voltage regulator and the output voltage is to be provided to the load.

25 Claims, 6 Drawing Sheets

US 10,908,668 B2

VOLTAGE DROOP MITIGATION TECHNOLOGY IN ARRAY PROCESSOR CORES

TECHNICAL FIELD

Embodiments generally relate to voltage droop mitigation in a computer architecture. More particularly, embodiments relate to estimating a worst-case voltage droop of an electrical load (e.g., a processing core) executing a particular workload, and reducing the average guard bands associated with voltage droop mitigation. As a result, the power consumption and if the system is power constrained, performance may be improved.

BACKGROUND

The performance of a load may be limited by power constraints. For example, the load may operate at a highest possible allowed voltage that the power budget allows to maximize computations by the load. A sudden power draw by the load may drop the voltage (e.g., a voltage droop). Therefore, conventional technologies may rely on various techniques to reduce the possibility of the voltage dropping below a voltage minimum. These techniques may help reduce the voltage guard bands that are otherwise larger to ensure that voltage does not drop below the minimum. Overall power may be reduced by using lower voltages. A power limited load may benefit from this reduction by increasing performance by using the saved voltage to increase the clock frequency or computing resource utilization.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
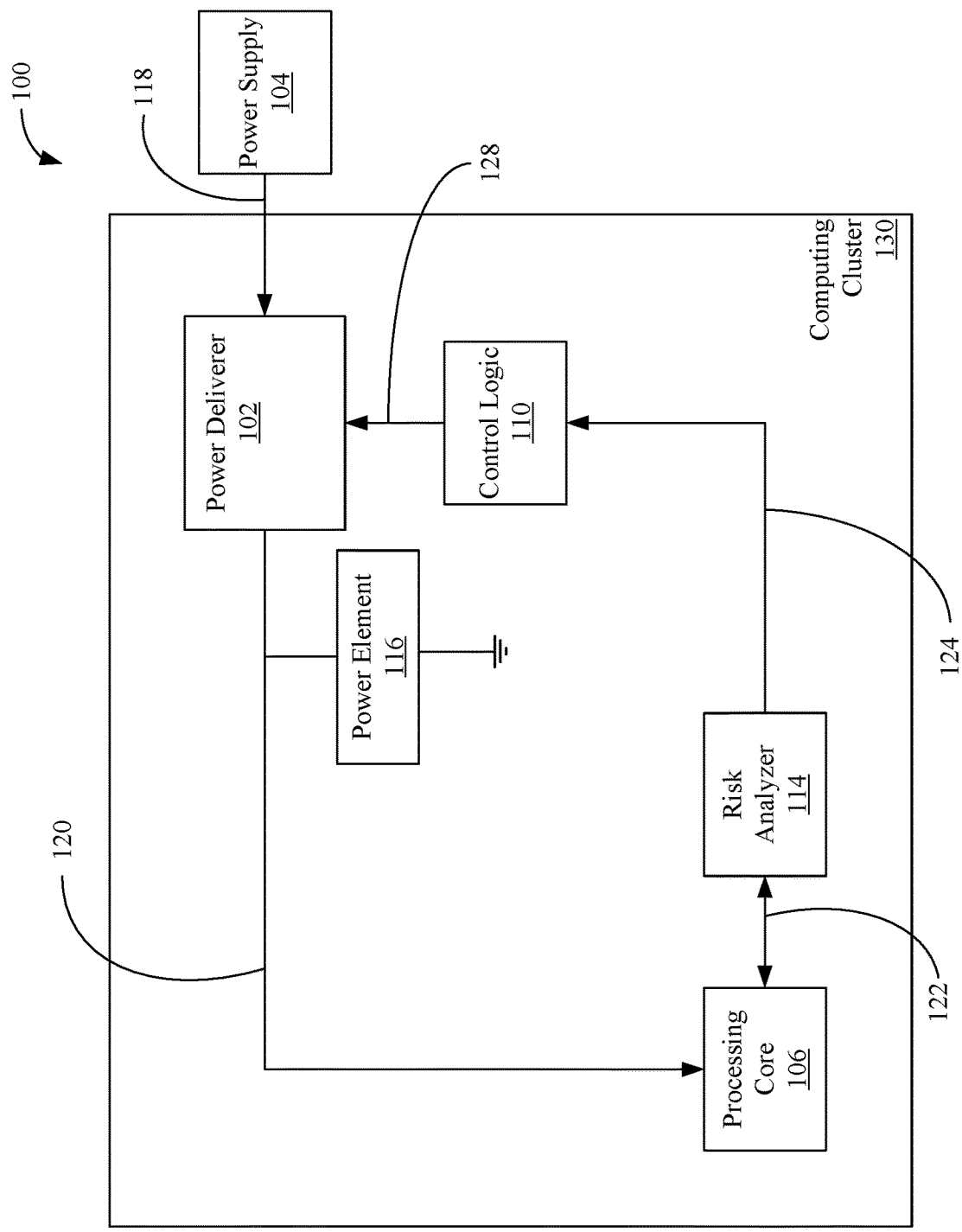
FIG. 1 is a block diagram of an example of a computing architecture according to an embodiment.

Turning now to FIG. 1, a computing architecture 100 (e.g., a system-on-chip/SoC) is shown in which a power deliverer 102 (e.g., a voltage regulator) receives power 118 from a power supply 104 (e.g., a supply rail voltage). The power deliverer 102 may provide power 120 to the processing core 106. The power deliverer 102 may be capable of dynamically adjusting an output voltage of the power deliverer 102. For example, a voltage component of the power 120 may be adjusted by the power deliverer 102 depending on demands by a processing core 106. The voltage component of power 120 may be referred to as the output voltage.

The processing core 106 may include an array of processing elements. The processing core 106 may cause a voltage droop of the output voltage due to a sudden power (e.g., current) demand by the processing core 106. The voltage droop may be a sudden drop in the output voltage. The voltage droop may be referred to as a $$\frac{di}{dt}$$

(e.g., current derivative) droop. The power deliverer 102 may include a closed-loop, analog control mechanism that continuously tracks the output voltage to maintain the output voltage at a target output voltage (e.g., $V_{cc}$) and corrects for observed power deviations. Such a tracking mechanism however may not respond quickly enough to completely correct voltage deviations when exposed to sudden current consumption spikes of the processing core 106, which may result in the voltage droop. If the output voltage drops below a minimum value (e.g., $V_{min}$) during the voltage droop event, the processing core 106 may fail (e.g., perform incorrect calculations and erase memory). Guard banding may be utilized to reduce the possibility of the output voltage reducing below the minimum value $V_{min}$ during the voltage droop. Guard banding may constrain the output voltage to be set to a voltage in which a maximum possible voltage droop may not drop the output voltage to be below the minimum value $V_{min}$. Static guard banding may be inefficient since the output voltage may need to be set to a higher value than what is typically needed by the processing core 106 for a majority of the time.

Therefore, to enhance performance and power usage, a risk analyzer 114 may estimate a maximum possible droop based on a program to be executed by the processing core 106, and the control logic 110 may dynamically change the guard band in response to the estimated maximum possible droop. Thus, the risk analyzer 114 may dynamically adjust the guard band of the power deliverer 102 based on the specific characteristics of a program to be executed by the processing core 106 to reduce or avoid altogether static guard banding.

The rate of change of current with respect to time (current derivative) may be known as the instantaneous rate of change of the current and may be a derivative of the current with respect to time. The current derivative may be proportional to the voltage droop, which may be the $$\frac{di}{dt}$$

droop. For example, as the current derivative increases, a voltage droop may increase as well. Different programs with sequences of high power operations (e.g., floating point operations) tend to produce a greater current derivative than graphs with only low power operations (integer operations), and therefore may produce higher voltage droops. Therefore, an estimated voltage droop may be determined from a worst-case (i.e., maximum) possible current derivative for a particular program.

The risk signal 124 may include an estimation of a droop risk associated with execution of programs by the processing core 106. The estimation of the droop risk may be a maximum estimated voltage droop and/or the estimated maximum current derivative. The control logic 110 may adjust a guard band to modify the output voltage of the power deliverer 102 based on the risk signal 124.

The power deliverer 102 may be a core-level voltage regulator, such as a Fully Integrated Voltage Regulator (FIVR). In some embodiments, if the computing architecture 100 includes several cores, each core may be supplied with power by a different FIVR. Thus, the computing architecture 100 may include a plurality of power deliverers 102 and processing cores 106 in some embodiments. If a plurality of processing cores 106 are included, one risk analyzer 114 may analyze the risk if one power deliverer 102 provides voltage to the processing cores 106. In some embodiments, a plurality of computing clusters 130 may be provided, i.e. a plurality of processing cores 106 are coupled to different power deliverers 102, and each power deliverer 102 is coupled to a different risk analyzer 114.

The power deliverer 102 may provide the power 120 to the processing core 106. A power element 116 (e.g., capacitor(s) and/or inductor(s)) may also temporarily provide a portion of the power 120 to the processing core 106. For example, a rapid increase in a dynamic capacitance of the processing core 106 may cause a corresponding rapid change in the current drawn by the processing core 106. Capacitance of the power element 116 on a supply line may compensate for the change in the current demand for a limited amount of time. Once the capacitive charge of the power element 116 is depleted, the power deliverer 102 may be exposed to the increased current demand. As such, the output voltage of the power deliverer 102 drops (i.e., a voltage droop) until the power deliverer 102 is able to adjust to the new operating point.

The guard band of the power deliverer 102 may set the steady output voltage of the power deliverer 102 to be higher than the minimum voltage $V_{min}$. The steady output voltage may be higher than the minimum voltage $V_{min}$ by an amount that minimizes and/or prevents the possibility that the output voltage falls below the minimum voltage $V_{min}$ even in the event of a worst-case droop.

The processing core 106 may be a graph-parallel architecture including Field Programmable Gate Arrays (FPGAs), data flow processors, etc. Programs in these parallel architectures may be in the form of graphs of parallel operations (e.g., graph nodes) and dependencies (edges connecting the graph nodes). Thus, each graph node may be a particular operation of the program.

In graph-parallel architectures, a program may be written in the form of a graph and mapped onto the processing core 106 (e.g., place and route) in the form of parallel operations to assign functions to the processing elements of the processing core 106. In contrast, in some other serial architectures (e.g., a Von Neumann architecture) the program may be written serially, and read by the processor core one operation at a time. Therefore, differences may exist between the form of programs for serial architectures and programs for graph-parallel architectures, which may influence droop mitigation analysis and design.

For example, data flow programming may involve developing an application that is constructed as a graph that includes computational "nodes" that execute user or pre-defined functions. These nodes may be connected by "edges" that represent the communication channels between the computations. As messages arrive at a node, the node may apply its function and then may forward the result of the function to other dependent nodes that may be connected to it by its out-going edges. Operations may be performed concurrently among the computational resources available on a platform, such as the processing elements of the processing core 106, since the computation is pipelined among the nodes connected serially and/or computation is expressed in a parallel manner if there are parallel branches in the dependency tree.

When developing a data flow application, developers may make decisions about the structure of the flow graph. For example, the developers may choose what code should be encapsulated in each node and what dependencies may be expressed as edges. In distributed memory implementations, decisions may be made about placement on devices or data transfers across memory domains. Additional properties may also be able to be set on the nodes and edges. There may be many ways to express the same algorithm as a data flow graph. Thus, a streaming or data flow application may process a sequence of values as the value passes through different nodes, and in some cases the values may processed in parallel by parallel nodes.

The processing elements of the processing core 106 may be an array of simple computational elements such as arithmetic logic units (ALUs), general purpose computational elements and/or specialized computational elements to consistently execute specific functions (e.g., add, multiply, subtract). Some general purpose computational elements may execute a variety of functions. The processing core 106 may be referred to as an "array processing core." An array processing core may be an accelerator core in a system-on-chip with a dedicated FIVR such as the power deliverer 102.

The risk analyzer 114 and control logic 110 may enhance the dynamic droop guard band adjustment, and consequently reduce the average supply voltage of the processing core 106, thereby reducing the output voltage of the power deliverer 102 without affecting performance. The risk analyzer 114 may receive a program to be executed by the processing core 106. In some embodiments, the risk analyzer 114 may be part of a firmware that provides the program to the processing core 106 through signal 122. In some embodiments, the risk analyzer 114 may be separate from the firmware and receives the program from the firmware, which provides the program to both the processing core 106 and the risk analyzer 114. The program may include graph-like representations, which may be mapped onto the plurality of processing elements. The risk analyzer 114 may be a hardware or part of a firmware that configures the processing core 106 (e.g., a dataflow machine, systolic array data processing units, FPGAs, etc.) prior to the execution of graphs of the program.

The risk analyzer 114 may assign voltage estimated droop risks to the graphs. Once the estimated droop risks are determined, the risk analyzer 114 may output a risk signal 124 associated with the estimated droop risk, and for example may include a risk value corresponding to the estimated droop risk. The risk signal 124 may be received by the control logic 110. Based on the risk signal 124, the control logic 110 may provide an adjustment signal 128 to the power deliverer 102 to adjust the guard band of the power deliverer 102 to adjust the output voltage according to the graphs. The graphs may be currently executing or about to execute on the processing core 106 during the adjustment of the output voltage.

In some embodiments, the risk analyzer 114 may include a data structure (e.g., lookup table or array) storing an association with different graph types and/or different graphs that were previously encountered, to estimated droop risks. The risk analyzer 114 may then use a graph of the program to be executed by the processing core 106 as a key to the data structure to determine a respective estimated droop risk. If several graphs are to be executed in parallel by the processing core 106, the total estimation of the droop risk is based on a summation of each of the individual estimations of the droop risk associated with the several graphs.

As discussed above, in some embodiments, the processing core 106 may be programmed with a graph-like representation of a workload where each graph node maps to a processing element. Each graph executing on the processing core 106 may be associated with a risk cost value. The risk cost value may be the estimation of the droop risk of a particular graph, and may be determined as below:

Total risk cost of a graph=cost of processing elements+cost of interconnects+constants    Equation 1

To calculate equation 1, the risk analyzer may assume that in a worst case current derivative increase in which each of the computational resources (e.g., processing elements and interconnects) of the processing core 106 that are to execute the particular graph, increase power consumption simultaneously. The computational resources may include the processing elements, various control and data/information transfer circuitry and interconnects connecting the processing elements. Further, all of the processing elements and interconnects of a load may not be utilized by a particular graph, but a subset of the processing elements and interconnects may be utilized. Therefore, Equation 1 may only include the subset of processing elements and interconnects that are utilized by the particular graph, while ignoring the unused processing elements and interconnects. In Equation 1, the constants may include the cost of various control and data/information transfer circuitry around the processing core 106. The constants may be factors which are graph and program invariant. For example, control circuitry may be needed to execute each graph of a program, and so the control circuitry may be assigned values which are added together to determine the constants. Thus, the constants may be a summation of values associated with hardware elements which are utilized during execution of each of the graphs.

The cost of the processing elements, that are utilized by the particular graph, of Equation 1 may be determined as follows, where PE stands for the processing elements:

$$\text{Total } PE \text{ risk cost} = \sum_{n=1}^{\# types} (\text{Count}_n \times \text{Weight}_n) \quad \text{Equation 2}$$

For example, the array may include one or more types of processing elements configured to specifically execute one type of operation. Different types of processing elements may execute different tasks, such as multiply, add and division. Therefore, a first type of element may correspond to a first task (e.g., multiply), a second type of element may correspond to a second task (e.g., add) and a third type of element may correspond to a third task (e.g., division).

Each type of element has an associated weight value. For example, a processing element that executes a multiplication operation requires more power than a processing element that executes an addition operation. Therefore, the weight for processing elements executing multiplication is greater than the weight for processing elements executing addition.

Thus, Equation 2 associates each processing element involved with processing of the graph with a weight based on a type of the processing element, for example elements that do integer operations are expected to have lower weights than the ones that do floating point operations. These weights may be determined ahead of time via circuit modeling or silicon testing. For each type of processing element involved with the processing of the graph, Equation 2 may multiply the total number of processing elements of a particular type involved with the processing of the graph with a weight for that particular type to achieve a total risk for that particular type of processing element. The total risks may be summed to arrive at the cost of processing elements above.

In some embodiments, some processing elements may be multi-purpose array processing elements. In such embodiments, Equation 2 may be adjusted so that the weight value may be determined based on a type of operation to be executed by the processing elements.

The interconnects may be programmable wires and repeater buffers that connect the processing elements together. The cost of the interconnects may be determined as follows, which may be referred to as the interconnect risk cost. Interconnect portions may be calculated as a weighted sum, but the individual terms of the sum will refer to a number of repeater buffer steps and the covered wire distance.

$$\text{Interconnect risk cost} = \left[ \sum_{n=1}^{\# rptr\,buffer\ types} (\text{Count}_n \times \text{Weight}_n) \right] + \quad \text{Equation 3}$$

$$(\text{Total wire length} \times \text{Weight})$$

Therefore, the number of repeater buffers, which are disposed between and connect the wires, and the total wire length are used by Equation 3. The repeater buffers may boost the power of a signal carried by the wires due to electrical, capacitive and other losses. Equation 3 may consider risk of power loss due to buffer usage (summation of the repeater buffer types above), and the power loss due to the wires (total wire length×weight). The weight for the wires may be the power loss expected by each wire over a given distance (e.g., micrometer). As described in Equation 3, the different buffer types may be determined, and assigned different values. For each buffer type, a buffer value may be determined by the total number of buffer repeaters of the particular buffer type multiplied by a weight for that particular buffer type. The buffer values may be summed and then added to the power loss due to the wires to determine the interconnect risk cost. The weights of the wires and the buffers may be determined ahead of time via silicon testing.

The total risk cost value of the processing core 106 is the sum of the risk costs of all graphs executing on the processing core 106 in parallel. This computation may be performed by the risk analyzer 114. If several graphs are to be executed simultaneously and in parallel by the processing core 106, the total estimation of the droop risk is based on a summation of each of the individual estimations of droop risk associated with the several graphs.

The estimation of the droop risk may correspond to different guard band adjustments. For example, the control logic 110 may determine that different estimations of droop risks correspond to different guard bands, respectively.

Therefore, the risk analyzer 114 and the control logic 110 may dynamically adjust the guard band of the power deliverer 102 based on a droop risk of a graph(s) currently executing on the processing core 106, as opposed to a static guard band implementation. Thus, the processing core 106 may operate at a lower average voltage, which may be translated into enhanced power, performance, yield, binsplit and reliability. For example, the computing architecture 100 may have a power budget. By reducing the average power required by the voltage guard band of the power deliverer 102, power may be saved and/or other elements may have a higher allocation of the power budget to operate at faster clock frequencies to enhance performance.

The risk analyzer 114 may operate in a digital architectural domain. In contrast, the power deliverer 102 may include a closed-loop power control adjustment circuit to adjust the output voltage, which operates in the analog domain. The enhancement provided by the risk analyzer 114 may operate additively with the analog power control adjustment circuit to detect and react to processing core 106.

The processing core 106 may modify a current demand if the processing core 106 determines that the program includes a transition from a low to high power section of the program. This transition may correspond to a transition from a low estimated droop risk to a high estimated droop risk. The power deliverer 102 may therefore need to adjust the output voltage during the transition from the low to high power section. By doing so, the processing core 106 may adjust for the higher estimated droop risk by, for example, throttling until the power deliverer 102 adjusts the output voltage to the new voltage value based on the risk and adjustment signals 124, 128. The power deliverer 102 may communicate with the processing core 106 and notify the processing core 106 when the output voltage is adjusted to the new voltage value, or the processing core 106 may measure the output voltage to determine whether the output voltage is adjusted to the new voltage value. Once the output voltage is adjusted to the new voltage value, the processing core 106 may cease throttling.

While various elements have been illustrated separately, it is understood that various combinations may be possible. For example, the processing core 106 may include the risk analyzer 114 and/or the control logic 110. Further, the power deliverer 102 may include the control logic 110 and/or the risk analyzer 114. In some embodiments, the risk analyzer 114 may be a part of the processing core 106. The risk analyzer 114 and control logic 110 may also be combined together in some embodiments.

The risk analyzer 114 and the control logic 110 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations described above may be written in any combination of one or more programming languages, including an object oriented programming language such as JAVA, SMALLTALK, C++ or the like and conventional procedural programming languages, such as the "C" programming language or similar programming languages.

Figure 2:
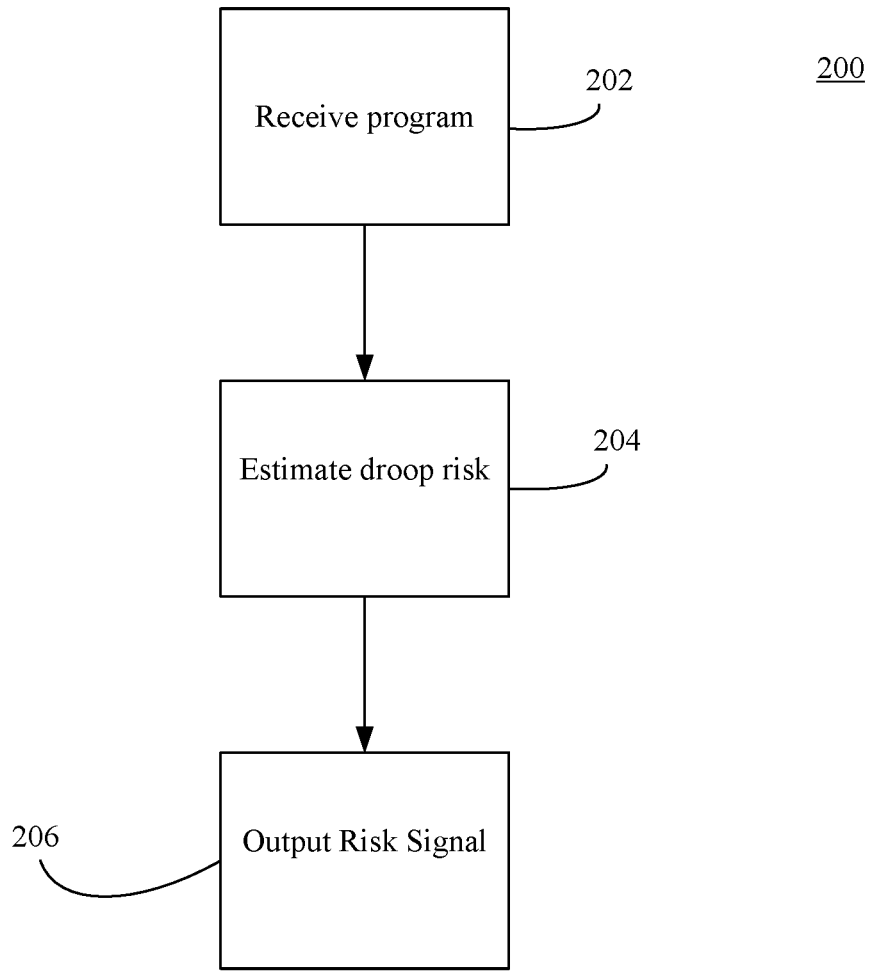
FIG. 2 is a flowchart of an example of a method of operating a power estimation control apparatus according to an embodiment.

FIG. 2 shows a method 200 of operating a risk analyzer. The method 200 may generally be implemented by the computing architecture 100 (FIG. 1), already discussed. More particularly, the method 200 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. For example, computer program code to carry out operations shown in the method 200 may be written in any combination of one or more programming languages, including an object oriented programming language such as JAVA, SMALLTALK, C++ or the like and conventional procedural programming languages, such as the "C" programming language or similar programming languages.

Illustrated processing block 202 may receive a program. The program may include graphs to be executed by a processing core. Illustrated processing block 204 may estimate a maximum droop risk of one or more the graphs of the program that are to be executed concurrently by the processing core. Illustrated processing block 206 may output a risk signal based on the estimated maximum droop risk to adjust a voltage guard band of a power deliverer during execution of the one or more graphs by the processing core. The power deliverer may provide the adjusted power to the processing core.

Figure 3A:
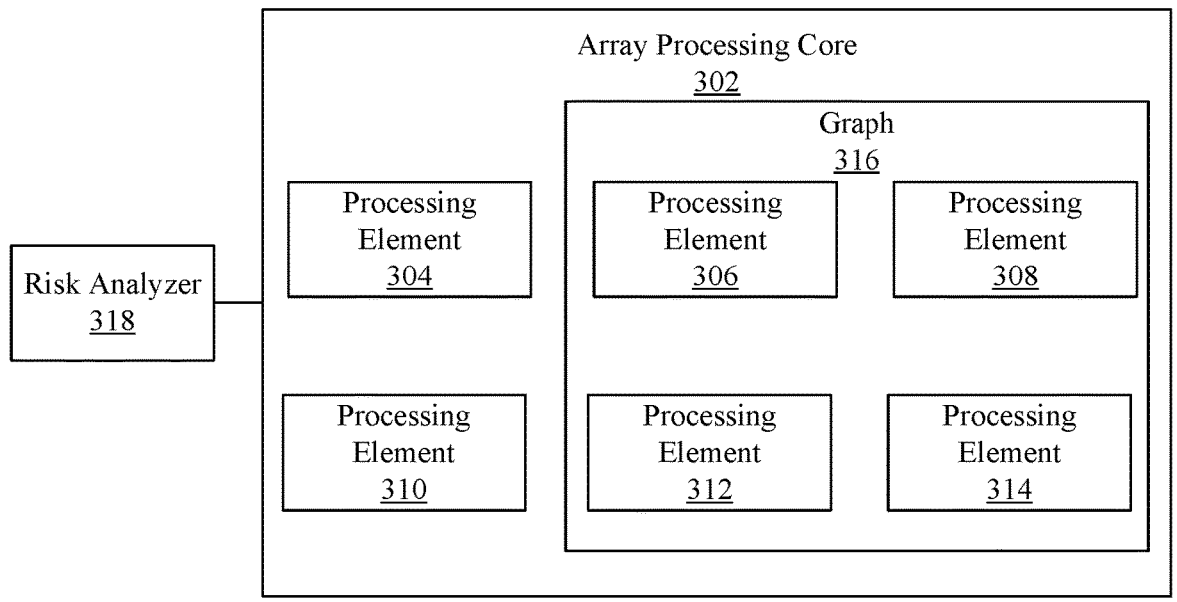
FIGS. 3A and 3B are block diagrams of examples of processing cores according to embodiments.
Figure 3B:
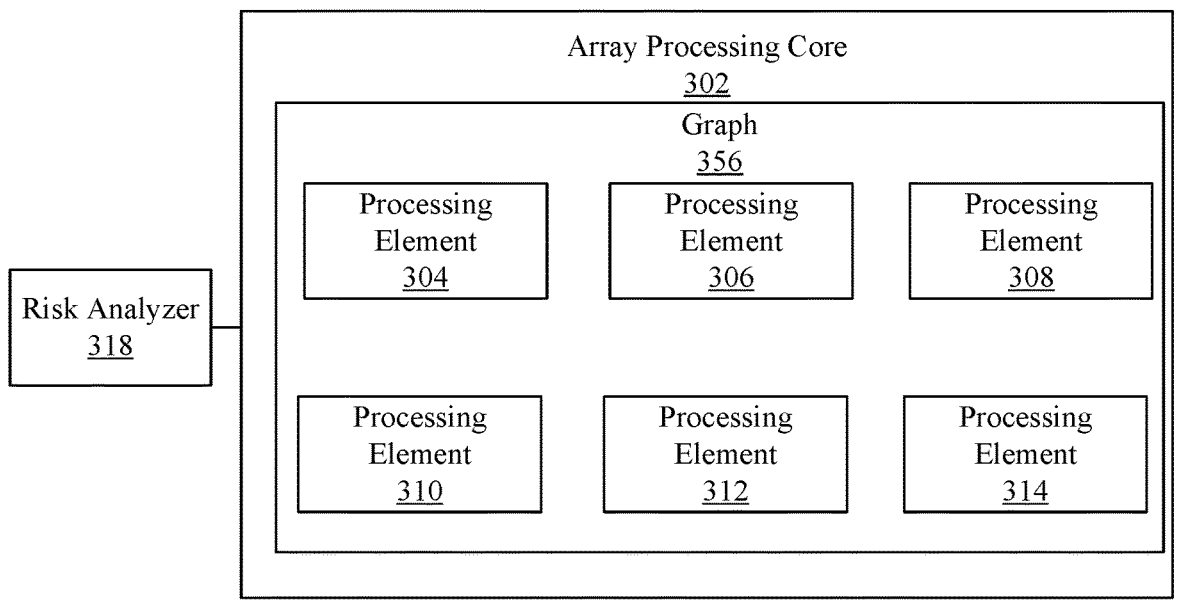

FIG. 3A illustrates a processing core 302 during execution of graph 316 of a program(s). FIG. 3B illustrates array processing core 302 during execution of graph 356 of the program(s). Execution of the graphs 316, 356 by the processing architecture 302 may be consecutive so that graph 356 executes after graph 316.

In some embodiments, a driver may map the graphs 316, 356, and the risk analyzer 318 may receive information of the graphs 316, 356 from the driver to conduct the risk analysis. The risk analyzer 318 may determine that the estimated droop risk of graph 316 may be less than the droop risk of the graph 356. For example, a total number of the processing elements 304, 306, 308, 310, 312, 314 that execute the graphs 316, 356 respectively may be proportional to and correspond to the droop risk. So, as a total number of the processing elements 304, 306, 308, 310, 312, 314 mapped to graphs increases, so does the maximum estimated droop risk. That is, the number of processing elements 304, 306, 308, 310, 312, 314 needed to execute a particular graph corresponds to a level of activity and scales with the maximum possible voltage droop of the graph.

For example, the total power utilized by only one of the processing elements 304, 306, 308, 310, 312, 314 will be less than the total power that may be utilized by all of the processing elements 304, 306, 308, 310, 312, 314. The maximum current derivative may be limited by the total used power, and therefore the maximum possible current derivative of only one of the processing elements 304, 306, 308, 310, 312, 314 may be less than the maximum possible current derivative of all of the processing elements 304, 306, 308, 310, 312, 314. Thus, the number of processing elements 304, 306, 308, 310, 312, 314 mapped to a graph may correspond to the maximum possible current derivative, and therefore correspond to the maximum possible voltage droop.

The illustrated risk analyzer 318 determines that the graph 316 may map to four processing elements 306, 308, 312, 314. That is, the graph 316 may be executed by the four processing elements 306, 308, 312, 314, and therefore maps to the four processing elements 306, 308, 312, 314. In contrast, the processing elements 304, 310 are not mapped graph 316 since the processing elements 304, 310 are not needed to execute graph 316. Thus, the droop risk may be estimated based on the mapping to the four processing elements 306, 308, 312, 314 to be a first value.

In contrast, graph 356 may execute on six processing elements 304, 306, 308, 310, 312, 314. Thus, the droop risk is estimated based on the mapping to the six processing elements 304, 306, 308, 310, 312, 314 to be a second value greater than the first value. Thus, the graph 356 has a higher estimated droop risk (e.g., higher droop risk value) than graph 316, since graph 356 maps to a greater total number of the processing elements 304, 306, 308, 310, 312, 314 than that of the graph 316.

The risk analyzer 318 may output a risk signal based on the estimated droop risks. The risk signal may be adjusted based on the estimated droop risk of graph 316, and may be associated with adjusting an output voltage of a power deliverer to a first voltage level. The power deliverer may provide the output voltage to the processing core 302.

The risk signal may be adjusted based on the estimated droop risk of graph 356, and may be associated with adjusting the output voltage of the power deliverer to a second voltage level, where the second voltage level is greater than the first voltage level. That is, since the estimated droop risk is greater for graph 356 compared to the estimated droop risk graph 316, the guard band of the voltage regulator during execution of graph 356 may be adjusted by the risk analyzer 318 to be higher during execution of graph 356 compared to the guard band during execution of graph 316. As described above, the output voltage is adjusted based on the guard band.

Therefore, in some embodiments, prior to the execution of the graph 316 by the array processing core 302, the risk analyzer 318 may determine the estimated droop risk of graph 316, and output the risk signal to adjust the output voltage of the voltage regulator to the first voltage level. After the graph 316 has executed, and prior to the execution of the graph 356 by the array processing core 302, the risk analyzer 318 may determine the estimated droop risk of graph 356, and output the risk signal to adjust the output voltage of the power deliverer to the second voltage level. Thus, the output voltage of the power deliverer may be lower during execution of graph 316 compared to graph 356.

In some embodiments, the array processing core 302 may throttle the execution of graph 356 until the output voltage has reached the second voltage level. In some embodiments however, the risk analyzer 318 may determine the estimated droop risk of graph 356, adjust the risk signal based on the estimated droop risk of graph 356 and output the risk signal to adjust the output voltage to the second voltage level concurrently with execution of graph 356 while the array processing core 302 is throttled. That is, a graph may be executed by the array processing core 302 concurrently with an adjustment to the output voltage associated with a maximum droop risk of the graph. In some embodiments, the array processing core 302 may only throttle when a lower droop risk graph has finished executing, the next graph executed by the array processing core 302 has a higher droop risk, and before the output voltage is adjusted to the higher voltage level required by the higher droop risk. This may be a performance enhancement to avoid a full stop of processing by the array processing core 302 while the output voltage is adjusted to higher values for higher droop risks.

While the risk analyzer 318 is illustrated as being a part of the array processing core 302, it may be understood that the risk analyzer 318 may be part of the array processing core 302. Moreover, interconnects of the processing elements 304, 306, 308, 310, 312, 314 may be considered to estimate the droop risk of graphs 316, 356.

Figure 4:
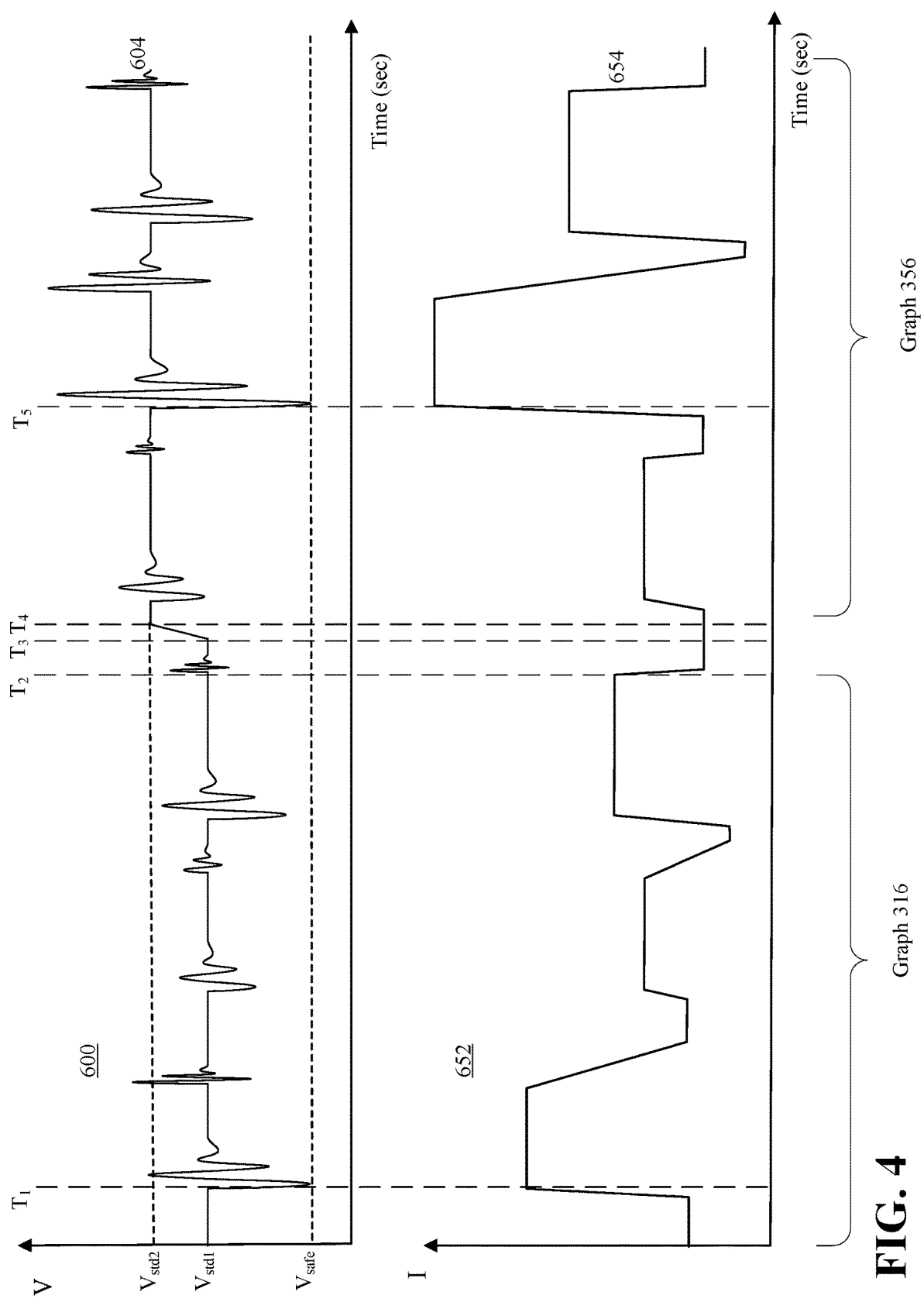
FIG. 4 is a set of timing diagrams of examples of voltage output and current demand.

FIG. 4 illustrates timing diagrams 600, 652 that correspond to the array processing core 302 of FIG. 3. Timing diagram 652 illustrates current demand 654 of processing core 302 and timing diagram 600 illustrates the output voltage 604 of the power deliverer during execution of the graphs 316, 356. In the timing diagrams 600, 652 a digital clock frequency of array processing core 302 may be held steady, although other embodiments may have varying frequency.

The illustrated voltage $V_{safe}$ denotes a minimum safe voltage $V_{min}$ of the array processing core 302 operating at given frequency. Therefore, since the output voltage 604 of the power deliverer is provided to the array processing core 302, the output voltage should remain at least at $V_{safe}$. As described above, if the output voltage 604 drops below $V_{safe}$, then the array processing core 302 may suffer from errors or failures.

A guard band of the power deliverer is set to $V_{std1}$-$V_{safe}$ during execution of the graph 316. Thus, the output voltage 604 is maintained at $V_{std1}$ until time $T_1$, when a maximum current demand 654 for graph 316 is reached. At time $T_1$, the output voltage 604 drops due to the increased current demand 654 by the array processor core 302, but remains above $V_{safe}$. Graph 316 completes execution at time $T_2$.

At a time between $T_2$ and $T_3$ graph 356 may be provided to the array processing core 302 and the risk analyzer 318. After the graph 356 is provided to the risk analyzer 318, the risk analyzer 318 may determine a new guard band for graph 356. As discussed above with respect to FIG. 3, the estimation of the droop risk of graph 356 may be higher than the estimation of the droop risk of graph 316. Therefore, the guard band may be readjusted to $V_{std2}$-$V_{safe}$ at time $T_3$ so that the output voltage reaches $V_{std2}$ at time $T_4$. $V_{std2}$ is higher than $V_{std1}$ since the droop risk is higher during execution of graph 356 compared to graph 316.

At time $T_5$, the array processing core 302 increases a current demand, causing a maximum voltage droop of graph 356. Since the output voltage 604 was at $V_{std2}$, the voltage droop results in the output voltage 604 dropping, but remaining above $V_{safe}$.

If, however, the guard band was not dynamically adjusted upward from $V_{std1}$-$V_{safe}$ to $V_{std2}$-$V_{safe}$, the output voltage 604 may have dropped below $V_{safe}$, affecting system correctness. Moreover, since the guard band does not need to be maintained at $V_{std2}$-$V_{safe}$ during execution of graph 316 and is rather maintained at the lower guard band of $V_{std1}$-$V_{safe}$, power efficiency may be enhanced since a lower average voltage is achieved.

Figure 5:
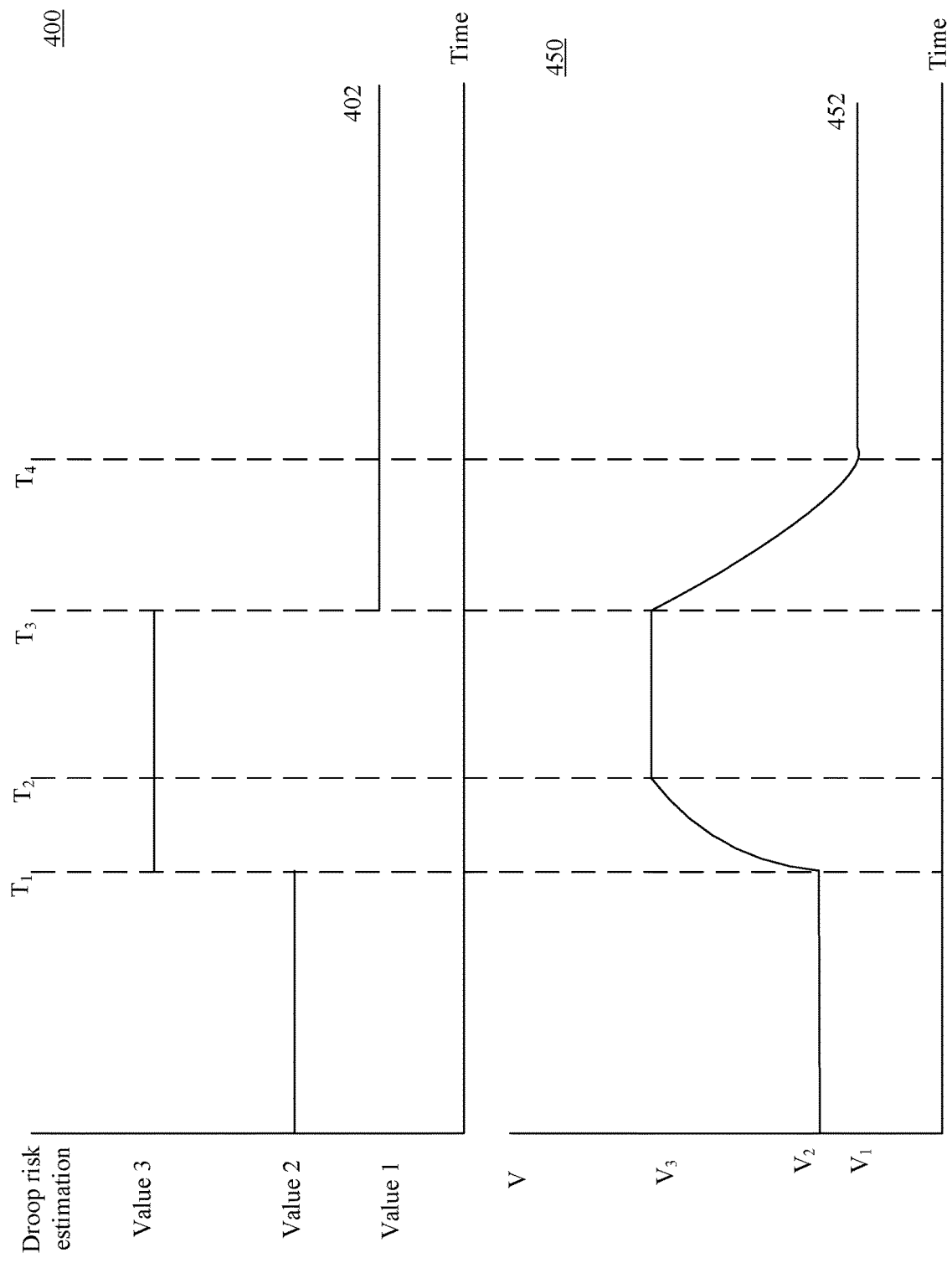
FIG. 5 is a set of timing diagrams of examples of voltage and droop risk estimation according to an embodiment.

FIG. 5 illustrates timing diagrams 400, 450. Timing diagram 400 illustrates a droop risk estimation 402 of an array processing core. A droop risk analyzer may determine the droop risk estimation 402 as described above. Timing diagram 450 illustrates an output voltage 452 of a power provider. The output voltage 452 may correspond to a guard band that is adjusted based on the droop risk estimation 402. The power provider may provide the output voltage 452 to the array processing core. The droop risk estimation 402 is estimated to be at value 2, based a first group of graphs of a program, until time $T_1$. While the estimated droop risk estimation 402 is estimated to be at value 2, the output voltage 452 is maintained at $V_2$ based on a guard band associated with value 2.

At time $T_1$, a second graph, which will be executed by the array processing core, may be analyzed by the droop risk analyzer. The droop risk estimation 402 is determined to be value 3 that is higher than value 2 of the first graph. As such, the droop risk analyzer determines that the droop risk estimation 402 is increased, and outputs a risk signal based on value 3 to adjust the voltage guard band upward so that the output voltage 452 is adjusted to $V_3$. The output voltage 452 is increased by the power provider to $V_3$ in the time between $T_1$ and $T_2$. At time $T_2$ the array processing core may execute the second graph. In-between time $T_1$ and $T_2$ the array processing core may be stopped. In some embodiments however, the array processing core may execute the second graph at time $T_1$ and throttle performance until time $T_2$ when the output voltage reaches $V_3$, hence limiting the droop risk until the output voltage is adjusted to $V_3$. A series of high power graphs may execute between $T_2$ and $T_3$ that have droop risk estimations 402 of value 3, and so the guard band remains the same so that the output voltage 452 is $V_3$.

At time $T_3$, a lower power graph, which will be executed by the array processing core, may be analyzed by the droop risk analyzer. The droop risk estimation 402 is determined to be value 1; and value 1 is lower than value 3. As such, the droop risk analyzer determines that the droop risk estimation 402 decreases, and adjusts the guard band downward. At time $T_3$, the output voltage 452 begins to drop to $V_1$ and reaches $V_1$ at time $T_4$.

Figure 6:
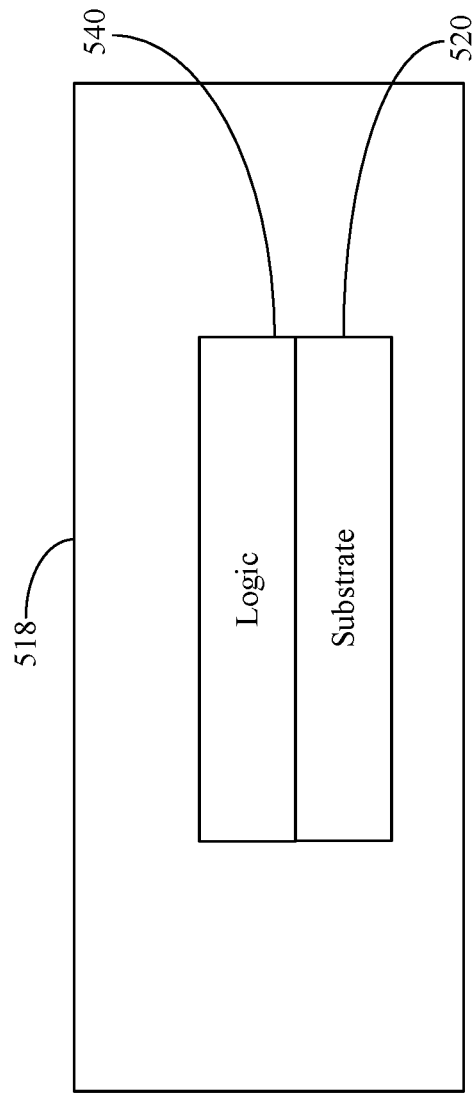
FIG. 6 is an illustration of an example of a semiconductor package apparatus according to an embodiment.

FIG. 6—shows a semiconductor package apparatus 518. The apparatus 518 may implement one or more aspects of the methods 200 (FIG. 2) and may be readily substituted for the array processing core 106, the risk analyzer 114, and the control logic 110 (FIG. 1), and array processing core 302 (FIGS. 3A-3B). The illustrated apparatus 518 includes one or more substrates 520 (e.g., silicon, sapphire, gallium arsenide) and logic 540 (e.g., transistor array and other integrated circuit/IC components) coupled to the substrate(s) 104. The logic 540 may be implemented at least partly in configurable logic or fixed-functionality logic hardware. In one example, the logic 540 includes transistor channel regions that are positioned (e.g., embedded) within the substrate(s) 520. Thus, the interface between the logic 540 and the substrate(s) 520 may not be an abrupt junction. The logic 540 may also be considered to include an epitaxial layer that is grown on an initial wafer of the substrate(s) 520.

Additional Notes and Examples

Example 1 may include a power bounded computing system, comprising a voltage regulator to provide an output voltage, a load including a plurality of computational resources including processing elements and interconnects connecting the processing elements, wherein the load is to receive the output voltage and execute a program comprising graphs of parallel operations and dependencies, and logic, implemented at least partly in one or more of configurable logic or fixed-functionality logic hardware, to determine, from the program, an estimation of a droop risk associated with execution of the graphs by the load, and output a risk signal based on the estimation, wherein the risk signal is to be associated with an adjustment in the output voltage.

Example 2 may include the system of example 1, wherein the logic is to determine the estimation based on a map of the graphs to the computational resources.

Example 3 may include the system of example 2, wherein to determine the estimation, the logic is to determine a number of the computational resources that are mapped to the graphs.

Example 4 may include the system of example 2, wherein a first graph of the graphs is mapped to a first group of the plurality of computational resources that is to execute the first graph, the estimation of the droop risk is to include a first estimation of the droop risk, that is associated with the execution of the first graph, to be determined based on a first total number of the first group, and the risk signal is to be output based on the first estimation to adjust the output voltage to a first voltage level.

Example 5 may include the system of example 4, wherein a second graph of the graphs is mapped to a second group of the plurality of computational resources that is to execute the second graph, a second total number of the second group is greater than the first total number; the estimation of the droop risk is to include a second estimation of the droop risk, that is associated with the execution of the second graph, to be determined based on the second total number, the second estimation being greater than the first estimation, and the risk signal is to be output based on the second estimation to adjust the output voltage to a second voltage level greater than the first voltage level.

Example 6 may include the system of any one of examples 1-5, wherein the logic is to determine the estimation of the droop risk based on values assigned to operations to be executed by the processing elements and values assigned to the interconnects.

Example 7 may include a power control apparatus, comprising one or more substrates, and logic coupled to the one or more substrates and implemented at least partly in one or more of configurable logic or fixed-functionality logic hardware, the logic to determine, from a program comprising graphs of parallel operations and dependencies, an estimation of a droop risk associated with execution of the graphs by a load, and output a risk signal based on the estimation, wherein the risk signal is to be associated with an adjustment in an output voltage of a voltage regulator and the output voltage is to be provided to the load.

Example 8 may include the apparatus of example 7, wherein the logic is to determine the estimation based on a map of the graphs to a plurality of computational resources, including processing elements and interconnects connecting the processing elements, of the load.

Example 9 may include the apparatus of example 8, wherein to determine the estimation, the logic is to determine a number of the computational resources that are mapped to the graphs.

Example 10 may include the apparatus of any one of examples 8-9, wherein the logic is to determine the estimation of the droop risk based on values assigned to operations to be executed by the processing elements and values assigned to the interconnects.

Example 11 may include the apparatus of example 8, wherein a first graph of the graphs is mapped to a first group of the plurality of computational resources that is to execute the first graph, the estimation of the droop risk is to include a first estimation of the droop risk, that is associated with the execution of the first graph, to be determined based on a first total number of the first group, and the risk signal is to be output based on the first estimation to adjust the output voltage to a first voltage level.

Example 12 may include the apparatus of example 11, wherein a second graph of the graphs is mapped to a second group of the plurality of computational resources that is to execute the second graph, a second total number of the second group is greater than the first total number, the estimation of the droop risk is to include a second estimation of the droop risk, that is associated with the execution of the second graph, to be determined based on the second total number, wherein the second estimation is greater than the first estimation, and the risk signal is to be output based on the second estimation to adjust the output voltage to a second voltage level greater than the first voltage level.

Example 13 may include the apparatus of any one of examples 7-9 and 11-12, wherein the logic coupled to the one or more substrates includes transistor channel regions that are positioned within the one or more substrates.

Example 14 may include a power control method, comprising determining, from a program comprising graphs of parallel operations and dependencies, an estimation of a droop risk associated with execution of the graphs by a load, and outputting a risk signal based on the estimation, wherein the risk signal is to be associated with an adjustment in an output voltage of a voltage regulator and the output voltage is to be provided to the load.

Example 15 may include the method of example 14, wherein the determining includes determining the estimation based on a map of the graphs to a plurality of computational resources, including processing elements and interconnects connecting the processing elements, of the load.

Example 16 may include the method of example 15, wherein the determining includes determining a number of the computational resources that are mapped to the graphs.

Example 17 may include the method of any one of examples 15-16, wherein the determining the estimation is based on values assigned to operations to be executed by the processing elements and values assigned to the interconnects.

Example 18 may include the method of example 15, wherein a first graph of the graphs is mapped to a first group of the plurality of computational resources that is to execute the first graph, the determining the estimation of the droop risk includes determining a first estimation of the droop risk, that is associated with the execution of the first graph, based on a first total number of the first group, and the outputting includes outputting the risk signal based on the first estimation to adjust the output voltage to a first voltage level.

Example 19 may include the method of example 18, wherein a second graph of the graphs is mapped to a second group of the plurality of computational resources that is to execute the second graph, a second total number of the second group is greater than the first total number, the determining the estimation of the droop risk includes determining a second estimation of the droop risk, that is associated with the execution of the second graph, based on the second total number, the second estimation being greater than the first estimation, and the outputting includes outputting the risk signal based on the second estimation to adjust the output voltage to a second voltage level greater than the first voltage level.

Example 20 may include at least one computer readable storage medium comprising a set of commands, which when executed by a computing system, cause the computing system to determine, from a program comprising graphs of parallel operations and dependencies, an estimation of a droop risk associated with execution of the graphs by a load, and output a risk signal based on the estimation, wherein the risk signal is to be associated with an adjustment in an output voltage of a voltage regulator and the output voltage is to be provided to the load.

Example 21 may include the at least one computer readable storage medium of example 20, wherein the commands, when executed, cause a computing system to determine the estimation based on a map of the graphs to a plurality of computational resources, including processing elements and interconnects connecting the processing elements, of the load.

Example 22 may include the at least one computer readable storage medium of example 21, wherein to determine the estimation, the commands, when executed, cause a computing system to determine a number of the computational resources that are mapped to the graphs.

Example 23 may include the at least one computer readable storage medium of any one of examples 21-22, wherein the estimation of the droop risk is to be determined based on values assigned to operations to be executed by the processing elements and values assigned to the interconnects.

Example 24 may include the at least one computer readable storage medium of example 21, wherein a first graph of the graphs is mapped to a first group of the plurality of computational resources that is to execute the first graph, the estimation of the droop risk is to include a first estimation of the droop risk, that is associated with the execution of the first graph, to be determined based on a first total number of the first group, and the risk signal is to be output based on the first estimation to adjust the output voltage to a first voltage level.

Example 25 may include the at least one computer readable storage medium of example 24, wherein a second graph of the graphs is mapped to a second group of the plurality of computational resources that is to execute the second graph, a second total number of the second group is greater than the first total number, the estimation of the droop risk is to include a second estimation of the droop risk, that is associated with the execution of the second graph, to be determined based on the second total number, the second estimation being greater than the first estimation, and the risk signal is to be output based on the second estimation to adjust the output voltage to a second voltage level greater than the first voltage level.

Example 26 may include a power control apparatus, comprising means for determining, from a program comprising graphs of parallel operations and dependencies, an estimation of a droop risk associated with execution of the graphs by a load, and means for outputting a risk signal based on the estimation, wherein the risk signal is to be associated with an adjustment in an output voltage of a voltage regulator and the output voltage is to be provided to the load.

Example 27 may include the apparatus of example 26, wherein the means for determining includes a means for determining the estimation based on a map of the graphs to a plurality of computational resources, including processing elements and interconnects connecting the processing elements, of the load.

Example 28 may include the apparatus of example 27, wherein the means for determining includes means for determining a number of the computational resources that are mapped to the graphs.

Example 29 may include the apparatus of any one of examples 27-28, wherein the means for determining the estimation includes means for determining the estimation based on values assigned to operations to be executed by the processing elements and values assigned to the interconnects.

Example 30 may include the apparatus of example 27, wherein a first graph of the graphs is mapped to a first group of the plurality of computational resources that is to execute the first graph, the means for determining the estimation of the droop risk includes means for determining a first estimation of the droop risk, that is associated with the execution of the first graph, based on a first total number of the first group, and the means for outputting includes means for outputting the risk signal based on the first estimation to adjust the output voltage to a first voltage level.

Example 31 may include the apparatus of example 30, wherein a second graph of the graphs is mapped to a second group of the plurality of computational resources that is to execute the second graph, a second total number of the second group is greater than the first total number, wherein the means for determining the estimation of the droop risk includes means for determining a second estimation of the droop risk, that is associated with the execution of the second graph, based on the second total number, the second estimation being greater than the first estimation, and wherein the means for outputting includes means for outputting the risk signal based on the second estimation to adjust the output voltage to a second voltage level greater than the first voltage level.

Techniques described herein may therefore solve problems associated with power consumption of computing systems, and in particular system-on-chips. Techniques described herein may enhance power efficiency by minimizing voltage output when small maximum voltage droops are predicted, and increasing voltage output when large maximum voltage droops are predicted.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent on the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Moreover, the term "plurality" with respect to a particular item may not necessarily refer to all items present in a given solution and may rather simply be considered two or more items. Similarly, the term "each" in reference to a plurality of items may not necessarily refer to all items in a given solution and may rather simply be considered one or more items.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner on a study of the drawings, specification, and following claims.

We claim:

1. A power bounded computing system, comprising:
   a voltage regulator to provide an output voltage;
   a load including a plurality of computational resources including processing elements and interconnects connecting the processing elements, wherein the load is to receive the output voltage and execute a program comprising graphs of parallel operations and dependencies; and
   logic, implemented at least partly in one or more of configurable logic or fixed-functionality logic hardware, to:
   determine, from the program, an estimation of a droop risk associated with execution of the graphs by the load;
   output a risk signal based on the estimation, wherein the risk signal is to be associated with an adjustment in the output voltage;
   identify that a first graph of the graphs is to be mapped to a first group of the plurality of computational resources that is to execute the first graph;
   identify that a second graph of the graphs is to be mapped to a second group of the plurality of computational resources that is to execute the second graph, wherein a second total number of computational resources of the second group is greater than a first total number of computational resources of the first group;
   adjust the risk signal based on the first group to adjust the output voltage to a first voltage level; and
   adjust the risk signal based on the second group to adjust the output voltage to a second voltage level greater than the first voltage level.

2. The system of claim 1, wherein the logic is to determine the estimation based on a map of the graphs to the computational resources.

3. The system of claim 2, wherein to determine the estimation, the logic is to determine a number of the computational resources that are mapped to the graphs.

4. The system of claim 2, wherein:
   the estimation of the droop risk is to include a first estimation of the droop risk, that is associated with the execution of the first graph, to be determined based on the first total number of the first group; and
   the risk signal is to be output based on the first estimation to adjust the output voltage to the first voltage level.

5. The system of claim 4, wherein:
   the estimation of the droop risk is to include a second estimation of the droop risk, that is associated with the execution of the second graph, to be determined based on the second total number, the second estimation being greater than the first estimation; and the risk signal is to be output based on the second estimation to adjust the output voltage to the second voltage level.

6. The system of claim 1, wherein the logic is to determine the estimation of the droop risk based on values assigned to operations to be executed by the processing elements and values assigned to the interconnects.

7. A power control apparatus, comprising:
one or more substrates; and
logic coupled to the one or more substrates and implemented at least partly in one or more of configurable logic or fixed-functionality logic hardware, the logic to:
determine, from a program comprising graphs of parallel operations and dependencies, an estimation of a droop risk associated with execution of the graphs by a load that is to include a plurality of computational resources;
output a risk signal based on the estimation, wherein the risk signal is to be associated with an adjustment in an output voltage of a voltage regulator and the output voltage is to be provided to the load;
identify that a first graph of the graphs is to be mapped to a first group of the plurality of computational resources that is to execute the first graph;
identify that a second graph of the graphs is to be mapped to a second group of the plurality of computational resources that is to execute the second graph, wherein a second total number of computational resources of the second group is greater than a first total number of computational resources of the first group;
adjust the risk signal based on the first group to adjust the output voltage to a first voltage level; and
adjust the risk signal based on the second group to adjust the output voltage to a second voltage level greater than the first voltage level.

8. The apparatus of claim 7, wherein the logic is to determine the estimation based on a map of the graphs to the plurality of computational resources, wherein the plurality of computational resources is to include processing elements and interconnects connecting the processing elements.

9. The apparatus of claim 8, wherein to determine the estimation, the logic is to determine a number of the computational resources that are mapped to the graphs.

10. The apparatus of claim 8, wherein the logic is to determine the estimation of the droop risk based on values assigned to operations to be executed by the processing elements and values assigned to the interconnects.

11. The apparatus of claim 8, wherein:
the estimation of the droop risk is to include a first estimation of the droop risk, that is associated with the execution of the first graph, to be determined based on the first total number of the first group; and
the risk signal is to be output based on the first estimation to adjust the output voltage to the first voltage level.

12. The apparatus of claim 11, wherein:
the estimation of the droop risk is to include a second estimation of the droop risk, that is associated with the execution of the second graph, to be determined based on the second total number, wherein the second estimation is greater than the first estimation; and
the risk signal is to be output based on the second estimation to adjust the output voltage to the second voltage level.

13. The apparatus of claim 7, wherein the logic coupled to the one or more substrates includes transistor channel regions that are positioned within the one or more substrates.

14. A method comprising:
determining, from a program comprising graphs of parallel operations and dependencies, an estimation of a droop risk associated with execution of the graphs by a load that includes a plurality of computational resources;
outputting a risk signal based on the estimation, wherein the risk signal is to be associated with an adjustment in an output voltage of a voltage regulator and the output voltage is to be provided to the load;
identifying that a first graph of the graphs is mapped to a first group of the plurality of computational resources that is to execute the first graph;
identifying that a second graph of the graphs is mapped to a second group of the plurality of computational resources that is to execute the second graph, wherein a second total number of computational resources of the second group is greater than a first total number of computational resources of the first group;
adjusting the risk signal based on the first group to adjust the output voltage to a first voltage level; and
adjusting the risk signal based on the second group to adjust the output voltage to a second voltage level greater than the first voltage level.

15. The method of claim 14, wherein the determining includes determining the estimation based on a map of the graphs to the plurality of computational resources, wherein the plurality of computational resources includes processing elements and interconnects connecting the processing elements.

16. The method of claim 15, wherein the determining includes determining a number of the computational resources that are mapped to the graphs.

17. The method of claim 15, wherein the determining the estimation is based on values assigned to operations to be executed by the processing elements and values assigned to the interconnects.

18. The method of claim 15, wherein:
the determining the estimation of the droop risk includes determining a first estimation of the droop risk, that is associated with the execution of the first graph, based on the first total number of the first group; and
the outputting includes outputting the risk signal based on the first estimation to adjust the output voltage to the first voltage level.

19. The method of claim 18, wherein:
the determining the estimation of the droop risk includes determining a second estimation of the droop risk, that is associated with the execution of the second graph, based on the second total number, the second estimation being greater than the first estimation; and
the outputting includes outputting the risk signal based on the second estimation to adjust the output voltage to the second voltage level.

20. At least one non-transitory computer readable storage medium comprising a set of commands, which when executed by a computing system, cause the computing system to:
determine, from a program comprising graphs of parallel operations and dependencies, an estimation of a droop risk associated with execution of the graphs by a load that is to include a plurality of computational resources;
output a risk signal based on the estimation, wherein the risk signal is to be associated with an adjustment in an output voltage of a voltage regulator and the output voltage is to be provided to the load;

identify that a first graph of the graphs is to be mapped to a first group of a plurality of the computational resources that is to execute the first graph;

identify that a second graph of the graphs is to be mapped to a second group of the plurality of computational resources that is to execute the second graph, wherein a second total number of computational resources of the second group is greater than a first total number of computational resources of the first group;

adjust the risk signal based on the first group to adjust the output voltage to a first voltage level; and adjust the risk signal based on the second group to adjust the output voltage to a second voltage level greater than the first voltage level.

21. The at least one non-transitory computer readable storage medium of claim 20, wherein the commands, when executed, cause a computing system to determine the estimation based on a map of the graphs to the plurality of computational resources, including processing elements and interconnects connecting the processing elements.

22. The at least one non-transitory computer readable storage medium of claim 21, wherein to determine the estimation, the commands, when executed, cause a computing system to determine a number of the computational resources that are mapped to the graphs.

23. The at least one non-transitory computer readable storage medium of claim 21, wherein the estimation of the droop risk is to be determined based on values assigned to operations to be executed by the processing elements and values assigned to the interconnects.

24. The at least one non-transitory computer readable storage medium of claim 21, wherein:

the estimation of the droop risk is to include a first estimation of the droop risk, that is associated with the execution of the first graph, to be determined based on the first total number of the first group; and the risk signal is to be output based on the first estimation to adjust the output voltage to the first voltage level.

25. The at least one non-transitory computer readable storage medium of claim 24, wherein:

the estimation of the droop risk is to include a second estimation of the droop risk, that is associated with the execution of the second graph, to be determined based on the second total number, the second estimation being greater than the first estimation; and the risk signal is to be output based on the second estimation to adjust the output voltage to the second voltage level.

* * * * *